United States Patent

Tappe et al.

Patent Number: 4,963,661
Date of Patent: Oct. 16, 1990

[54] WATER SOLUBLE NAPHTHYLAZOPYRAZOLONE DYESTUFFS HAVING FIBER-REACTIVE GROUPS OF THE VINYLSULFONE SERIES

[75] Inventors: Horst Tappe, Dietzenbach; Dieter Oehme, Florsheim am Main; Ludwig Schläfer, Kelkheim; Werner H. Russ, Hofheim am Taunus, all of Fed. Rep. of Germany

[73] Assignee: Hoechst Aktiengesellschaft, Frankfurt am Main, Fed. Rep. of Germany

[21] Appl. No.: 198,136

[22] Filed: May 24, 1988

[30] Foreign Application Priority Data

May 26, 1987 [DE] Fed. Rep. of Germany ....... 3717667

[51] Int. Cl.$^5$ ............ C09B 62/51; D06P 1/384; D06P 3/66
[52] U.S. Cl. ............ 534/642; 534/582; 534/593; 534/887
[58] Field of Search ............ 534/642

[56] References Cited

U.S. PATENT DOCUMENTS

| | | | |
|---|---|---|---|
| 3,406,163 | 10/1968 | Meininger et al. | 534/642 |
| 3,655,642 | 4/1972 | Meininger et al. | 534/642 |
| 4,036,825 | 7/1977 | Fuchs et al. | 534/642 |
| 4,134,887 | 1/1979 | Fuchs et al. | 534/642 |
| 4,746,323 | 5/1988 | Phillips et al. | 534/642 X |

FOREIGN PATENT DOCUMENTS

| | | | |
|---|---|---|---|
| 3703565 | 8/1988 | Fed. Rep. of Germany | 534/642 |
| 58-160360 | 9/1983 | Japan | 534/642 |
| 1106244 | 3/1968 | United Kingdom | 534/642 |
| 1268699 | 3/1972 | United Kingdom | 534/642 |
| 1290505 | 9/1972 | United Kingdom | 534/642 |
| 1362577 | 8/1974 | United Kingdom | 534/642 |

Primary Examiner—Floyd D. Higel
Assistant Examiner—Fiona T. Powers

[57] ABSTRACT

Water-soluble monoazo compounds according to the general formula (1) below having valuable fiber-reactive dyestuff properties which dye carboxamido- and/or hydroxy-containing materials, in particular cellulose fibers, in fast yellow to orange hues.

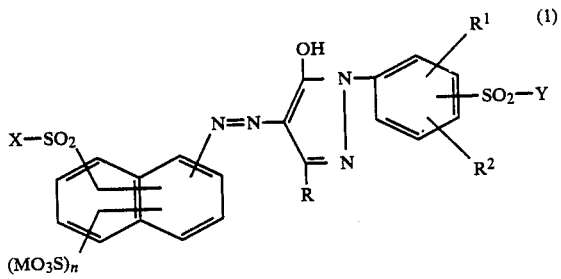

in which the symbols denote:
M is hydrogen or an alkali metal,
$R^1$ is hydrogen, methyl, ethyl, methoxy, ethoxy, chlorine, bromine, carboxy or sulfo,
$R^2$ is hydrogen, methyl, ethyl, methoxy, ethoxy, chlorine, or bromine,
R is carboxy or lower carbalkoxy,
n is the number zero or 1,
X and Y independently of each other are each β-thiosulfatoethyl or β-sulfatoethyl or vinyl, however, in the case of X and/or Y being equal to vinyl the index n must be 1.

13 Claims, No Drawings

WATER SOLUBLE NAPHTHYLAZOPYRAZOLONE DYESTUFFS HAVING FIBER-REACTIVE GROUPS OF THE VINYLSULFONE SERIES

The field of the invention is that of fiber-reactive azo dyestuffs.

British Patent No. 1,268,699 describes monoazo compounds having a 1-phenylpyrazol-5-one coupling component; they contain one or two β-phosphatoethylsulfonyl groups as the fiber-reactive radical(s) bonded to the 1-phenyl radical of the coupling component or to the benzene radical of the diazo component or to both. However, these known monoazo compounds which can be used as fiber-reactive dyestuffs have only little affinity and cannot be used in one of the industrially most important dyeing processes, namely the exhaust process from a long liquor.

Furthermore, British Patent No. 1,290,505 discloses monoazo compounds having a 1-phenylpyrazolon-5-one coupling component whose 1-phenyl radical is substituted by a fiber-reactive β-sulfatoethylsulfonyl, β-thiosulfatoethylsulfonyl or vinylsulfonyl group. However, these known monoazo dyestuffs have a fixation property which, in view of today's requirements from fiber-reactive dyestuffs, seemed in need of improvement and is no longer fully satisfactory from an industrial standpoint.

The present invention now provides monoazo compounds according to the general formula (1)

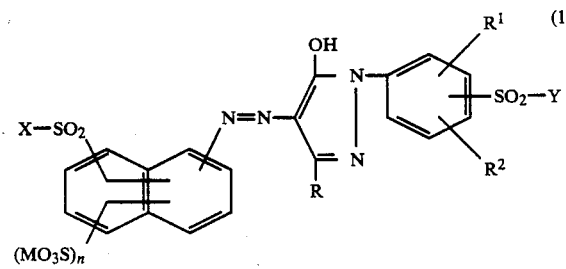

which have improved fiber-reactive dyestuff properties.

The symbols in formula (1) have the following meanings:

M is a hydrogen atom or an alkali metal such as sodium, potassium or lithium;

n is the number zero or 1 (where in the case of n=zero this group stands for a hydrogen atom);

$R^1$ is hydrogen, methyl, ethyl, methoxy, ethoxy, chlorine, bromine, carboxy or sulfo and $R^2$ is hydrogen, methyl, ethyl, methoxy, ethoxy, chlorine or bromine, where $R^1$ and $R^2$ can have meanings identical to or different from one another;

R is carboxy or carbalkoxy having 2 to 5 carbon atoms such as carbethoxy and carbomethoxy;

X is a β-thiosulfatoethyl group or preferably a β-sulfatoethyl group or

X is the vinyl group, in which case, however, n must stand for the number 1;

Y is a β-thiosulfatoethyl group or preferably a β-sulfatoethyl group or

Y is the vinyl group, in which case, however, n must stand for the number 1.

The groups $-SO_2-X$ and $-SO_2-Y$ have meanings identical or different from one another. Preferably, the azo group is bonded to the naphthalene ring in the 2-position, and the group $-SO_2-X$ is preferably bonded to the naphthalene nucleus in the 4- or 8-position. The group $-SO_2-Y$ is bonded to the benzene nucleus preferably in the meta- or para-position relative to the $N^1$ atom of the pyrazolone.

Preferably, the formula radicals X and Y in the compounds (1) are both simultaneously a β-sulfatoethyl group. Furthermore, preference is given to compounds of the formula (1) in which $R^1$ and $R^2$ are each hydrogen.

Preference is also given to compounds of the general formula (1) in which $R^1$ denotes a hydrogen atom or a methyl or methoxy group and $R^2$ denotes a hydrogen atom or a methoxy group.

Particular preference is given to azo compounds according to the general formula (1a)

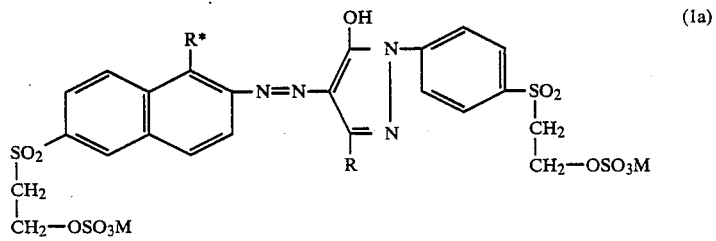

in which $R^*$ is a hydrogen atom or a sulfo group and M and R have the abovementioned, in particular their preferred meanings, where R is preferably the carbethoxy group and $R^*$ the sulfo group or R is the carboxy group and $R^*$ a hydrogen atom.

Hereinbefore and hereinafter, sulfo groups are groups according to the general formula $-SO_3M$, carboxy groups are groups according to the general formula $-COOM$, thiosulfato groups are groups according to the general formula $-S-SO_3M$ and sulfato groups are groups according to the general formula $-OSO_3M$, M having one of the abovementioned meanings.

The monoazo compounds according to the invention can be present in the form of their acid compounds and in the form of their salts; preferably, they are in the form of the alkali metal salts and are preferably used in the form of these salts for the dyeing (including printing) of hydroxy- and/or carboxamido-containing materials, in particular fiber materials.

The present invention further relates to a process for preparing the novel compounds of the general formula (1). They can be prepared according to the invention by coupling a diazonium salt of an aromatic amino compound according to the general formula (2)

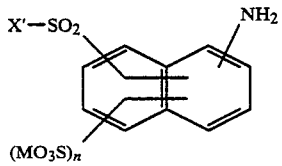

in which M and n have the abovementioned meanings and X' has one of the meanings for X or stands for the β-hydroxyethyl group with a compound according to the general formula (3)

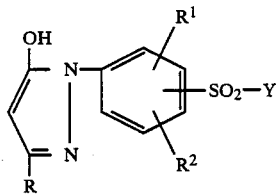

in which R, R¹ R² have the abovementioned meanings and Y' has one of the meanings for Y or stands for the hydroxyethyl group and in the case where X' or Y' or both represent a β-hydroxyethyl group, converting the resulting monoazo compound by means of a conventional sulfating agent such as, for example, 95 to 100% strength sulfuric acid, sulfuric acid containing sulfur trioxide or chlorosulfonic acid, for example, at a temperature between 0 and 25° C. to the compound (1) having the corresponding β-sulfatoethylsulfonyl group.

The pyrazolone compounds of the general formula (3) which are known per se and are used as the starting compounds can advantageously also be prepared in such a way that a diazonium salt of an aromatic amine of the general formula (4)

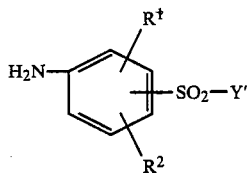

in which R¹, R² and Y' have the abovementioned meanings, is reacted in twice the molar amount with a dialkyl acetylsuccinate having alkyl groups each containing 1 to 4 carbon atoms, preferably each containing 1 or 2 carbon atoms, by adding the dialkyl acetylsuccinate to an aqueous suspension or solution of an equimolar amount of a diazonium salt of the aromatic amine of the general formula (4), adjusted to a pH from 4.5 to 5.5, at a temperature between 5° and 25° C. and at a pH between 3.5 and 5.5, preferably between 4 and 5, and continuing and completing the reaction after some time at a pH between 6 and 7.5 and at a temperature between 15° and 25° C. In this procedure, first coupling of one mole of the diazonium salt with the acetylsuccinic acid takes place followed by ring closure to give the pyrazolone of the general formula (3). If in the starting compound (4) the group Y' is a β-hydroxy ethyl group, the coupling and the ring closure can also be carried out in an alkaline range such as at a pH between 6.5 and 9.

The coupling reaction of a compound of the general formula (3) with the diazonium salt of an aromatic amine of the general formula (2) takes place in analogy with the customary and known procedures, for example, in an aqueous medium at a pH between 4 and 7.5, preferably between 4 and 7, and at a temperature between 0° and 35° C., preferably between 10° and 25° C., it also being possible, if both X and Y are β-hydroxyethyl groups, for the coupling to be carried out in a weakly alkaline range such as between 7.5 and 9.

Starting compounds of the general formula (2) which are used according to the invention as the diazo component are for example the diazo components which are mentioned in the Examples below, in particular for example 6-(β-sulfatoethylsulfonyl)-2-aminonaphthalene,
8-(β-sulfatoethylsulfonyl)-2-aminonaphthalene,
6-(β-sulfatoethylsulfonyl)-1-sulfo-2-aminonaphthalene,
6-(β-sulfatoethylsulfonyl)-8-sulfo-2-aminonaphthalene,
8-(β-sulfatoethylsulfonyl)-6-sulfo-2-aminonaphthalene,
6-(β-thiosulfatoethylsulfonyl)-2-aminonaphthalene,
6-(β-thiosulfatoethylsulfonyl)-1-sulfo-2-aminonaphthalene, of these in particular 6-(β-sulfatoethylsulfonyl)-2-aminonaphthalene, 8-(β-sulfatoethylsulfonyl)-2-aminonaphthalene, 6-(β-sulfatoethylsulfonyl)-1-sulfo-2-aminonaphthalene and 6-(β-sulfatoethylsulfonyl)-8-sulfo-2-aminonaphthalene.

Pyrazolone compounds of the general formula (3) are for example the coupling components mentioned in the Examples, in particular for example 1-[4'-(β-sulfatoethylsulfonyl)phenyl]-3-carbethoxypyrazol-5-one, 1-[4'-(β-sulfatoethylsulfonyl)phenyl]-3-carboxypyrazol-5-one, 1-[3'-(β-sulfatoethylsulfonyl)phenyl]-3-carbethoxypyrazol-5-one, 1-[4'-(β-sulfatoethylsulfonyl)phenyl]-3-carbomethoxypyrazol-5-one, 1-[2'-methoxy-5'-(β-sulfatoethylsulfonyl)phenyl]-3-carbethoxypyrazol-5-one, of these in particular 1-[4'-(β-sulfatoethylsulfonyl)phenyl]-3-carbethoxypyrazol-5-one, 1-[4'-(β-sulfatoethylsulfonyl)phenyl]-3-carboxypyrazol-5-one and 1-[4'-(β-sulfatoethylsulfonyl)phenyl]-3-carbomethoxypyrazol-5-one.

Separation and isolation of the compounds of the general formula (1) prepared according to the invention from the synthesis solutions can be carried out by generally known methods, for example, either by precipitation from the reaction medium by means of electrolytes such as, for example, sodium chloride or potassium chloride, or by evaporation of the reaction solution, for example spray-drying, it being possible to add a buffer substance to this reaction solution.

The compounds of the general formula (1) according to the invention—designated as the compounds (1) below—have fiber-reactive properties and valuable dyestuff properties. They can therefore be used for dyeing (including printing) natural, regenerated or synthetic hydroxy-containing and/or carboxamido-containing materials, for example in the form of sheet-like structures such as paper and leather, or polyamide or polyurethane, but in particular materials in fiber form such as cellulose fiber materials, silk, wool and synthetic polyamide and polyurethane fibers. The solutions formed during the synthesis of the compounds (1) can also be used, if appropriate after the addition of a buffer substance, if appropriate also after concentration, directly as liquid formulation for dyeing purposes.

The compounds (1) can be applied in accordance with the application according to the invention to the substrates mentioned, in particular to the fiber materials mentioned by the application procedures known for water-soluble, in particular fiber-reactive, dyestuffs and can be fixed, for example, by applying the compound (1) in dissolved form to the substrate or by introducing it therein and fixing it on or in this substrate, if appropriate under the influence of heat and/or, if appropriate under the influence of an alkaline agent. A great number of such dyeing and fixing procedures have been described in the literature such as, for example, in German Offenlegungsschrift No. 3,025,572.

The present invention therefore also relates to the use of compounds (1) for dyeing (including printing) hydroxy- and/or carboxamido-containing materials and processes for applying them to those substrates. Preferably, the materials are used in the form of fiber materials, in particular in the form of textile fibers such as yarns, wound packages and fabrics. This procedure is carried out in analogy with known methods of application and fixation of fiber-reactive dyestuffs.

The monoazo compounds according to the invention are distinguished by a high tinctorial strength and a good color build-up; therefore they provide strong dyeings and prints of yellow to orange shades. In particular their dyeings and prints on cellulose fiber materials have good performance and processing fastness properties such as, for example, good properties to light, washing, chlorinated water, gas fumes, hot press, pleating, decatizing, dry cleaning, crock, acid, alkali and cross-dyeing fastness properties and also good alkaline and acid perspiration fastness properties. The degrees of fixation of the compounds according to the invention are very high, for which reason the unfixed portion of the compound according to the invention is only small and accordingly only a small amount of this applied dyestuff compound ends up in the waste water by way of the rinse or wash water during the finishing of the dyeings and prints. The monoazo compounds according to the invention provide prints with crisp contours and a clear white ground; the prints and dyeings neither stain adjacent material nor bleed and show a high stability to acid upon storage. Furthermore, the compounds according to the invention are not phototropic.

The Examples below serve to illustrate the invention. Parts and percentages are by weight, unless noted otherwise. Parts by weight relate to parts by volume as the kilogram to the liter.

The compounds described in terms of a formula in these Examples are given in the form of the free acids; in general they are prepared in the form of their sodium or potassium salts and isolated and are used for the dyeing in the form of their salts. The starting compounds and components mentioned in the form of the free acid in the Examples below, in particular the table Examples, can likewise be used as such or in the form of their salts, preferably alkali metal salts such as sodium or potassium salts, in the synthesis.

The absorption maxima ($\gamma_{max}$ values) given for the visible range were determined using the aqueous solution of the alkali metal salts.

EXAMPLE 1

A neutral solution of the sodium salt from 28.1 parts of 4-(β-sulfatoethylsulfonyl)aniline and 5.0 parts of sodium nitrite in 100 parts of water are added to a mixture of 100 parts of ice and 35 parts of a 30% strength aqueous hydrochloric acid with vigorous stirring. Stirring is continued for another hour, and the suspension of the diazonium salt is brought to a pH of 5 with sodium carbonate and 22.8 parts of diethyl acetylsuccinate are then slowly added over a period of 30 minutes during which the reaction temperature is maintained at 10° to 15° C. and the pH is kept at 4. Stirring is continued for about another hour (until no more diazonium salt can be detected), the pH is increased to 6, and stirring is continued for another 5 to 7 hours at this pH.

The solution of the diazonium salt from 41.1 parts of 6-(β-sulfatoethylsulfonyl)1-sulfo-2-naphthylamine in approximately 300 parts of water prepared in a conventional manner is added to the solution of the pyrazolone coupling component thus prepared, the pH is adjusted to a value of 4 to 5, and the coupling reaction is completed within this pH range.

After the coupling reaction is completed, the mixture is clarified by means of 10 parts of activated carbon followed by filtration. The azo compound synthesized can be isolated from the filtrate by salting out with sodium chloride or potassium chloride or by evaporation or spray-drying. This gives the alkalimetal salt of the compound of the formula

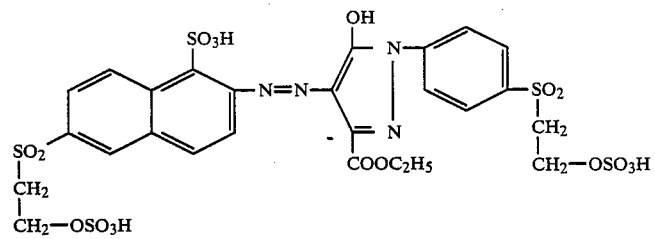

($\lambda_{max}$=433nm)

in the form of an electrolyte-containing product. This monoazo compound according to the invention has very good fiber-reactive dyestuff properties and gives yellow dyeings and prints in very good color yields on the materials mentioned in the description such as in particular cellulose fiber materials, by the conventional dyeing and printing processes for fiber-reactive dyestuffs.

The dyeings and prints obtainable according to the invention are distinguished by very good light fastness properties both in a dry state and also when wetted with drinking water or with an alkaline or acid perspiration solution and also by good washing fastness properties (such as in 60° C. and 95° C. washings), by good water fastness properties, by good alkaline and acid perspiration fastness properties, by good alkaline and acid cross-dyeing fastness properties and also by good stability to acid upon storage.

EXAMPLE 2

To prepare a monoazo compound according to the invention, 24.8 parts of 4-(β-hydroxyethylsulfonyl)acetanilide are first hydrolyzed by boiling for two hours in an aqueous hydrochloric acid solution (50 parts of water and 25 parts of concentrated hydrochloric acid), the mixture is then cooled, 30 parts of ice are added and the mixture is diazotized by means of 18.5 parts of a 40% strength aqueous sodium nitrite solution. The diazonium salt suspension is stirred for another hour, the pH is increased to 3, and 4 parts of sodium bicarbonate and 22.7 parts of diethyl acetylsuccinate are then added. The reaction mixture is stirred for 10 more hours at a temperature from 10° to 20° C. and a pH between 3 and 4 until no diazonium salt can be detected, is then adjusted to a pH of 11, heated to 80° C. and stirred at this temperature and this pH for another hour. The mixture is then decolorized with two parts of sodium dithionite and then filtered. 100 parts of ice water are added to the fil-trate and the pH of the filtrate is brought to 2.5 with 46 parts of a 30% strength aqueous hydrochloric acid. The precipitated 1-[4'-(β-hydroxyethylsulfonyl)phenyl]-3-carboxypyrazol-5-one synthesized is filtered off with suction and dried and then introduced into a mixture consisting of 65 parts of 100% strength sulfuric acid and 10 parts of 50% strength oleum at 15° to 25° C. and stirring is continued until a clear solution is obtained, which is poured onto 300 parts of ice, and the solution is brought to a pH of 4.5, using approximately 90 parts of calcium carbonate heated to 80° C., the precipitated calcium sulfate is filtered off with suction and washed with 200 parts of hot water.

The suspension of the diazonium salt prepared in a conventional manner from 33.1 parts of 8-(β-hydroxyethylsulfonyl)-2-naphthylamine in approximately 300 parts of water is added to the combined wash water and filtrate. The coupling reaction is carried out at a temperature between 20° and 25° C. and a pH between 4 and 5.

The resulting monoazo compound according to the invention is salted out using sodium chloride. It is obtained as the sodium salt in the form of an electrolyte-containing (predominantly sodium chloride containing) product; written in the form of the free acid, it has the formula

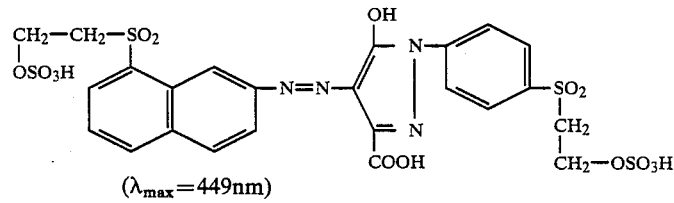

($\lambda_{max}=449$nm)

and has very good fiber-reactive dyestuff properties; it dyes the fiber materials mentioned in the description such as in particular cellulose fiber materials in strong orange hues using the application and fixation methods which are customary in industry for fiber-reactive dyestuffs. The compound according to the invention has very high fixation properties, and the dyeings and prints obtainable therewith have good to very good fastness properties such as, for example, those which are mentioned for the monoazo compound of Example 1 according to the invention.

EXAMPLE 3

To prepare a monoazo compound according to the invention having the 8-thiosulfatoethylsulfonyl group, a solution of 69.8 parts of the monoazo compound described in Example 2 in 500 parts of water is brought at a temperature of 20° C. to a pH of 11 with an aqueous sodium hydroxide solution, the resulting suspension is stirred for another 5 minutes, 35 parts of sodium thiosulfate are then added, the pH is adjusted to a value between 5 and 6 with acetic acid, the reaction mixture is heated to 70° C. and stirring is continued for another 6 to 8 hours within this pH range at 60 to 70° C. The reaction mixture is then clarified hot in a conventional manner and the filtrate is evaporated or spray-dried.

This gives an electrolyte salt-containing yellow-brown powder containing the sodium salt according to the invention of the compound of the formula

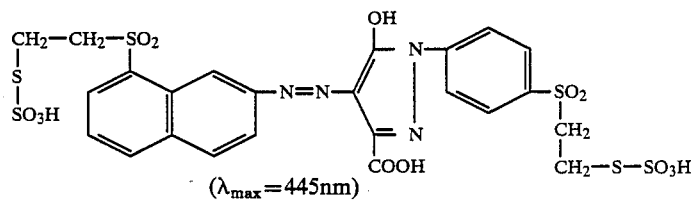

($\lambda_{max}=445$nm)

This compound likewise has very good fiber-reactive dyestuff properties and gives, using the dyeing and printing processes which are customary in industry, dyeings and prints in strong, reddish yellow shades on fiber materials mentioned in the description, in particular cellulose fiber materials, these dyeings and prints having the same good to very good fastness properties as have been described for the β-sulfatoethylsulfonyl monoazo compound of Example 2 according to the invention.

EXAMPLE 4

A solution of the coupling component is prepared in accordance with the first paragraph of Example 2 and combined with the suspension of the diazonium salt from 41.1 parts of 6-(β-sulfatoethylsulfonyl)-1-sulfo-2-aminonaphthalene (according to Example 1), and the coupling reaction is completed at a temperature between 10° and 20° C. and a pH between 4 and 5. The azo compound according to the invention can be isolated from the synthesis solution as the alkali metal salt by evaporation or salting out in a conventional manner. Written in the form of the free acid, it has the formula

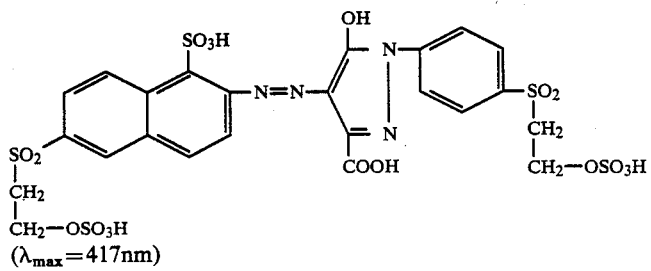

($\lambda_{max}$=417nm)

This monoazo compound according to the invention has very good fiber-reactive dyestuff properties and gives, using the conventional dyeing and printing processes for fiber-reactive dyeings, in particular on cellulose fiber materials yellow dyeings and prints in very good color yields and the same good fastness properties which have also been mentioned for the azo compound according to the invention of Example 1.

EXAMPLE 5

The aqueous solution of the diazonium salt from 33.1 parts of 6-(β-sulfatoethylsulfonyl)-2-aminonaphthalene is added to the solution of the coupling component according to the first paragraph of Example 2. The coupling is carried out at a pH from 4 to 5 and a temperature between 10° and 20° C. and the compound according to the invention is isolated, after the coupling reaction is completed, as the alkali metal salt by salting out or evaporation. Written in the form of the free acid, it has the formula

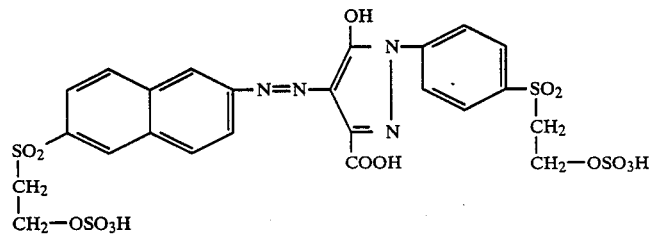

($\lambda_{max}$ = 445 nm).

This monoazo compound according to the invention has very good fiber-reactive dyestuff properties and gives, using the conventional dyeing and printing processes for fiber-reactive dyestuffs, in particular on cellulose fiber materials yellow dyeings and prints in very good color yields and with the same good fastness properties which have also been mentioned for the azo compound according to the invention of Example 1.

EXAMPLES 6 to 77

In the Table Examples below, further monoazo compounds according to the invention are described by means of the components according to a general formula (A)

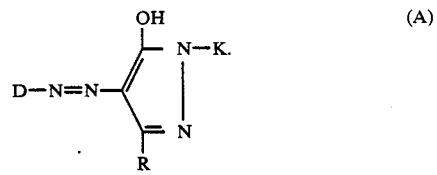

They can be prepared in a manner according to the invention, for example, according to one of the above Working Examples by means of the components which can be seen from the corresponding Table Examples in connection with formula (A) such as the diazo component D-NH₂ and the coupling component according to the general formula (B)

(B)

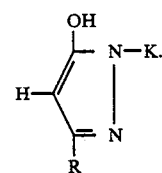

They have fiber-reactive dyestuff properties and give, in particular on cellulose fiber materials using the application and fixation methods customary for fiber-reactive dyestuffs, strong, fast dyeings and prints in the hues listed under the corresponding Table Example for dyeings on cotton.

| | Monoazo compound of formula (A) | | | Hue |
|---|---|---|---|---|
| Example | Radical D | Radical R | Radical K | ($\lambda_{max}$ = ... nm) |
| 6 | 4-(β-sulfatoethyl-sulfonyl)-naphth-1-yl | carboxy | 4'-(β-sulfato-ethylsulfonyl)-phenyl | orange |
| 7 | 5-(β-sulfatoethyl-sulfonyl)-naphth-1-yl | carboxy | 4'-(β-sulfato-ethylsulfonyl)-phenyl | orange |
| 8 | 5-(β-sulfatoethyl-sulfonyl)-naphth-2-yl | carboxy | 4'-(β-sulfato-ethylsulfonyl)-phenyl | yellow |

-continued

| Example | Monoazo compound of formula (A) | | | Hue ($\lambda_{max}$ = ... nm) |
|---|---|---|---|---|
| | Radical D | Radical R | Radical K | |
| 9 | 7-($\beta$-sulfatoethyl-sulfonyl)-naphth-2-yl | carboxy | 4'-($\beta$-sulfato-ethylsulfonyl)-phenyl | yellow |
| 10 | 8-($\beta$-sulfatoethyl-sulfonyl)-naphth-2-yl | carboxy | 4'-($\beta$-sulfato-ethylsulfonyl)-phenyl | yellow (446) |
| 11 | 4-($\beta$-sulfatoethyl-sulfonyl)-naphth-1-yl | carboxy | 3'-($\beta$-sulfato-ethylsulfonyl)-phenyl | orange |
| 12 | 5-($\beta$-sulfatoethyl-sulfonyl)-naphth-1-yl | carboxy | 3'-($\beta$-sulfato-ethylsulfonyl)-phenyl | orange (453) |
| 13 | 5-($\beta$-sulfatoethyl-sulfonyl)-naphth-2-yl | carboxy | 3'-($\beta$-sulfato-ethylsulfonyl)-phenyl | yellow |
| 14 | 6-($\beta$-sulfatoethyl-sulfonyl)-naphth-2-yl | carboxy | 3'-($\beta$-sulfato-ethylsulfonyl)-phenyl | yellow |
| 15 | 7-($\beta$-sulfatoethyl-sulfonyl)-naphth-2-yl | carboxy | 3'-($\beta$-sulfato-ethylsulfonyl)-phenyl | yellow (444) |
| 16 | 8-($\beta$-sulfatoethyl-sulfonyl)-naphth-2-yl | carboxy | 3'-($\beta$-sulfato-ethylsulfonyl)-phenyl | yellow (446) |
| 17 | 6-($\beta$-sulfatoethyl-sulfonyl)-naphth-2-yl | carboxy | 2'-methoxy-4'-($\beta$-sulfatoethyl-sulfonyl)-phenyl | reddish yellow |
| 18 | 5-($\beta$-sulfatoethyl-sulfonyl)-naphth-2-yl | carboxy | 2'-methoxy-4'-($\beta$-sulfatoethyl-sulfonyl)-phenyl | yellow |
| 19 | 6-($\beta$-sulfatoethyl-sulfonyl)-1-sulfo-naphth-2-yl | carbo-propoxy | 4'-($\beta$-sulfato-ethylsulfonyl)-phenyl | yellow (435) |
| 20 | 6-($\beta$-sulfatoethyl-sulfonyl)-1-sulfo-naphth-2-yl | carbo-methoxy | 4'-($\beta$-sulfato-ethylsulfonyl)-phenyl | yellow (433) |
| 21 | 6-($\beta$-sulfatoethyl-sulfonyl)-1-sulfo-naphth-2-yl | carbo-methoxy | 3'-($\beta$-sulfato-ethylsulfonyl)-phenyl | yellow (415) |
| 22 | 6-($\beta$-sulfatoethyl-sulfonyl)-1-sulfo-naphth-2-yl | carb-ethoxy | 3'-($\beta$-sulfato-ethylsulfonyl)-phenyl | yellow (420) |
| 23 | 6-($\beta$-sulfatoethyl-sulfonyl)-1-sulfo-naphth-2-yl | carboxy | 3'-($\beta$-sulfato-ethylsulfonyl)-phenyl | yellow |
| 24 | 6-($\beta$-sulfatoethyl-sulfonyl)-1-sulfo-naphth-2-yl | carbo-propoxy | 3'-($\beta$-sulfato-ethylsulfonyl)-phenyl | yellow |
| 25 | 6-($\beta$-sulfatoethyl-sulfonyl)-1-sulfo-naphth-2-yl | carb-ethoxy | 3'-($\beta$-thiosul-fatoethylsulfo-nyl)-phenyl | yellow |
| 26 | 6-($\beta$-sulfatoethyl-sulfonyl)-1-sulfo-naphth-2-yl | carb-ethoxy | 4'-($\beta$-thiosul-fatoethylsulfo-nyl)-phenyl | yellow |
| 27 | 6-($\beta$-sulfatoethyl-sulfonyl)-1-sulfo-naphth-2-yl | carb-ethoxy | 4'-vinylsulfo-nyl-phenyl | yellow (420) |
| 28 | 6-($\beta$-sulfatoethyl-sulfonyl)-1-sulfo-naphth-2-yl | carb-ethoxy | 3'-vinylsulfo-nyl-phenyl | yellow |
| 29 | 6-($\beta$-thiosulfatoethyl-sulfonyl)-1-sulfo-naphth-2-yl | carb-ethoxy | 3'-vinylsulfo-nyl-phenyl | yellow |
| 30 | 6-($\beta$-thiosulfatoethyl-sulfonyl)-1-sulfo-naphth-2-yl | carb-ethoxy | 4'-vinylsulfo-nyl-phenyl | yellow |
| 31 | 6-($\beta$-thiosulfatoethyl-sulfonyl)-1-sulfo-naphth-2-yl | carb-ethoxy | 4'-($\beta$-thiosulfa-toethyl)-phenyl | yellow (431) |
| 32 | 6-($\beta$-thiosulfatoethyl-sulfonyl)-1-sulfo-naphth-2-yl | carbo-methoxy | 4'-($\beta$-thiosulfa-toethyl)-phenyl | yellow |
| 33 | 6-($\beta$-thiosulfatoethyl-sulfonyl)-1-sulfo-naphth-2-yl | carboxy | 4'-($\beta$-thiosul-toethyl)-phenyl | yellow |
| 34 | 6-($\beta$-thiosulfatoethyl-sulfonyl)-1-sulfo-naphth-2-yl | carboxy | 3'-($\beta$-thiosul-fatoethylsulfo-nyl)-phenyl | yellow |
| 35 | 6-vinylsulfonyl-1-sulfo-naphth-2-yl | carboxy | 3'-vinylsulfo-nyl-phenyl | yellow |

-continued

| Example | Monoazo compound of formula (A) Radical D | Radical R | Radical K | Hue ($\lambda_{max} = \ldots$ nm) |
|---|---|---|---|---|
| 36 | 6-vinylsulfonyl-1-sulfo-naphth-2-yl | carboxy | 4'-vinylsulfonyl-phenyl | yellow |
| 37 | 6-vinylsulfonyl-1-sulfo-naphth-2-yl | carboxy | 4'($\beta$-sulfatoethylsulfonyl)-phenyl | yellow |
| 38 | 6-vinylsulfonyl-1-sulfo-naphth-2-yl | carboxy | 3'-($\beta$-sulfatoethylsulfonyl)-phenyl | yellow |
| 39 | 6-vinylsulfonyl-1-sulfo-naphth-2-yl | carboxy | 4'-($\beta$-thiosulfatoethylsulfonyl)-phenyl | yellow |
| 40 | 8-($\beta$-sulfatoethylsulfonyl)-6-sulfo-naphth-2-yl | carbethoxy | 4'-($\beta$-sulfatoethylsulfonyl)-phenyl | yellow (438) |
| 41 | 8-($\beta$-sulfatoethylsulfonyl)-6-sulfo-naphth-2-yl | carbomethoxy | 4'-($\beta$-sulfatoethylsulfonyl)-phenyl | yellow (437) |
| 42 | 8-($\beta$-sulfatoethylsulfonyl)-6-sulfo-naphth-2-yl | carboxy | 4'-($\beta$-sulfatoethylsulfonyl)-phenyl | yellow (438) |
| 43 | 8-($\beta$-sulfatoethylsulfonyl)-6-sulfo-naphth-2-yl | carboxy | 3'-($\beta$-sulfatoethylsulfonyl)-phenyl | yellow |
| 44 | 8-($\beta$-sulfatoethylsulfonyl)-6-sulfo-naphth-2-yl | carbomethoxy | 3'-($\beta$-sulfatoethylsulfonyl)-phenyl | yellow |
| 45 | 8-($\beta$-sulfatoethylsulfonyl)-6-sulfo-naphth-2-yl | carbethoxy | 3'-($\beta$-sulfatoethylsulfonyl)-phenyl | yellow |
| 46 | 8-($\beta$-thiosulfatoethylsulfonyl)-6-sulfo-naphth-2-yl | carbethoxy | 4'-($\beta$-thiosulfatoethylsulfonyl)-phenyl | yellow (439) |
| 47 | 6-($\beta$-sulfatoethylsulfonyl)-8-sulfo-naphth-2-yl | carbethoxy | 4'-($\beta$-thiosulfatoethylsulfonyl)-phenyl | yellow (442) |
| 48 | 6-($\beta$-sulfatoethylsulfonyl)-8-sulfo-naphth-2-yl | carbethoxy | 3'-($\beta$-thiosulfatoethylsulfonyl)-phenyl | yellow |
| 49 | 6-($\beta$-sulfatoethylsulfonyl)-8-sulfo-naphth-2-yl | carbethoxy | 3'-($\beta$-sulfatoethylsulfonyl)-phenyl | yellow |
| 50 | 6-($\beta$-sulfatoethylsulfonyl)-8-sulfo-naphth-2-yl | carbethoxy | 4'-($\beta$-sulfatoethylsulfonyl)-phenyl | yellow (441) |
| 51 | 6-($\beta$-sulfatoethylsulfonyl)-8-sulfo-naphth-2-yl | carboxy | 4'-($\beta$-sulfatoethylsulfonyl)-phenyl | yellow (440) |
| 52 | 6-($\beta$-sulfatoethylsulfonyl)-8-sulfo-naphth-2-yl | carbomethoxy | 4'-($\beta$-sulfatoethylsulfonyl)-phenyl | yellow |
| 53 | 6-($\beta$-thiosulfatoethylsulfonyl)-8-sulfo-naphth-2-yl | carbomethoxy | 4'-($\beta$-thiosulfatoethylsulfonyl)-phenyl | yellow |
| 54 | 6-vinylsulfonyl-8-sulfo-naphth-2-yl | carbethoxy | 4'-vinylsulfonyl-phenyl | yellow |
| 55 | 6-vinylsulfonyl-8-sulfo-naphth-2-yl | carbethoxy | 3'-vinylsulfonyl-phenyl | yellow |
| 56 | 5-vinylsulfonyl-1-sulfo-naphth-2-yl | carbethoxy | 3'-vinylsulfonyl-phenyl | yellow (418) |
| 57 | 5-vinylsulfonyl-1-sulfo-naphth-2-yl | carbethoxy | 4'-vinylsulfonyl-phenyl | yellow |
| 58 | 5-($\beta$-thiosulfatoethylsulfonyl)-1-sulfo-naphth-2-yl | carboxy | 4'-($\beta$-thiosulfatoethylsulfonyl)-phenyl | yellow (435) |
| 59 | 5-($\beta$-thiosulfatoethylsulfonyl)-1-sulfo-naphth-2-yl | carbethoxy | 3'-($\beta$-thiosulfatoethylsulfonyl)-phenyl | yellow |
| 60 | 5-($\beta$-sulfatoethylsulfonyl)-1-sulfo-naphth-2-yl | carbethoxy | 4'($\beta$-sulfatoethylsulfonyl)-phenyl | yellow (433) |
| 61 | 5-($\beta$-sulfatoethylsulfonyl)-1-sulfo-naphth-2-yl | carbomethoxy | 4'-($\beta$-sulfatoethylsulfonyl)-phenyl | yellow |
| 62 | 5-($\beta$-sulfatoethylsulfonyl)-1-sulfo-naphth-2-yl | carboxy | 4'-($\beta$-sulfatoethylsulfonyl)-phenyl | yellow (430) |
| 63 | 7-($\beta$-sulfatoethylsulfonyl)-5-sulfo-naphth-2-yl | carbethoxy | 4'-($\beta$-sulfatoethylsulfonyl)-phenyl | yellow |
| 64 | 7-($\beta$-sulfatoethylsulfonyl)- | carbo- | 4'-($\beta$-sulfato- | yellow |

-continued

| Example | Monoazo compound of formula (A) Radical D | Radical R | Radical K | Hue ($\lambda_{max}$ = ... nm) |
|---|---|---|---|---|
| | fonyl)-5-sulfo-naphth-2-yl | methoxy | ethylsulfonyl)-phenyl | |
| 65 | 7-(β-sulfatoethylsulfonyl)-5-sulfo-naphth-2-yl | carboxy | 4'-(β-sulfatoethylsulfonyl)-phenyl | yellow |
| 66 | 7-(β-sulfatoethylsulfonyl)-5-sulfo-naphth-2-yl | carbethoxy | 3'-(β-sulfatoethylsulfonyl)-phenyl | yellow |
| 67 | 7-(β-thiosulfatoethylsulfonyl)-5-sulfo-naphth-2-yl | carbethoxy | 4'-(β-thiosulfatoethylsulfonyl)-phenyl | yellow |
| 68 | 7-(β-thiosulfatoethylsulfonyl)-5-sulfo-naphth-2-yl | carbethoxy | 3'-(β-thiosulfatoethylsulfonyl)-phenyl | yellow |
| 69 | 7-vinylsulfonyl-5-sulfo-naphth-2-yl | carboxy | 4'-vinylsulfonyl-phenyl | yellow |
| 70 | 5-vinylsulfonyl-7-sulfo-naphth-2-yl | carbethoxy | 4'-vinylsulfonyl-phenyl | yellow |
| 71 | 5-vinylsulfonyl-7-sulfo-naphth-2-yl | carbethoxy | 3'-vinylsulfonyl-phenyl | yellow |
| 72 | 5-(β-thiosulfatoethylsulfonyl)-7-sulfo-naphth-2-yl | carbethoxy | 4'-(β-thiosulfatoethylsulfonyl)-phenyl | yellow |
| 73 | 5-(β-thiosulfatoethylsulfonyl)-7-sulfo-naphth-2-yl | carbethoxy | 3'-(β-thiosulfatoethylsulfonyl)-phenyl | yellow |
| 74 | 5-(β-sulfatoethylsulfonyl)-7-sulfo-naphth-2-yl | carbethoxy | 4'-(β-sulfatoethylsulfonyl)-phenyl | yellow |
| 75 | 5-(β-sulfatoethylsulfonyl)-7-sulfo-naphth-2-yl | carboxy | 4'-(β-sulfatoethylsulfonyl)-phenyl | yellow |
| 76 | 5-(β-sulfatoethylsulfonyl)-7-sulfo-naphth-2-yl | carbomethoxy | 4'-(β-sulfatoethylsulfonyl)-phenyl | yellow |
| 77 | 5-(β-sulfatoethylsulfonyl)-7-sulfo-naphth-2-yl | carbomethoxy | 3'-(β-sulfatoethylsulfonyl)-phenyl | yellow |

We claim:

1. A water-soluble monoazo compound according to the formula

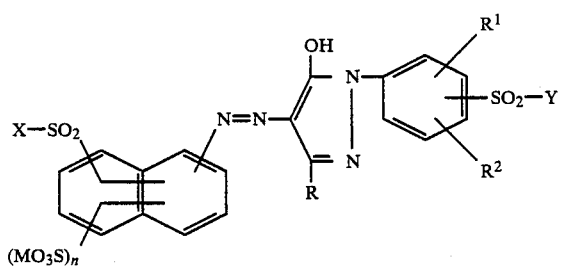

in which:
M is hydrogen or an alkali metal;
n is the number zero or 1;
$R^1$ is hydrogen, methyl, ethyl, methoxy, ethoxy, chlorine, bromine, carboxy or sulfo;
$R^2$ is hydrogen, methyl, ethyl, methoxy, ethoxy, chlorine or bromine;
R is carboxy or carbalkoxy having 2 to 5 carbon atoms; X is β-thiosulfatoethyl or β-sulfatoethyl or X is vinyl in which case, however, n must be 1, and Y is β-thiosulfatoethyl or β-sulfatoethyl or Y is vinyl in which case, however, n must be 1.

2. The compound as claimed in claim 1, wherein X stands for the β-sulfatoethyl group.

3. The compound as claimed in claim 1, wherein Y stands for the β-sulfatoethyl group.

4. The compound as claimed in claim 1, wherein $R^1$ is hydrogen.

5. The compound as claimed in claim 1, wherein both $R^1$ and $R^2$ are hydrogen.

6. A compound according to claim 2, wherein Y is β-sulfatoethyl.

7. A compound according to claim 2, wherein $R^1$ is hydrogen.

8. A compound according to claim 3, wherein $R^1$ is hydrogen.

9. A compound according to claim 4, wherein $R^1$ and $R^2$ are both hydrogen.

10. A compound according to claim 4, wherein $R^1$ and $R^2$ are both hydrogen.

11. The compound as claimed in claim 1 according to the formula

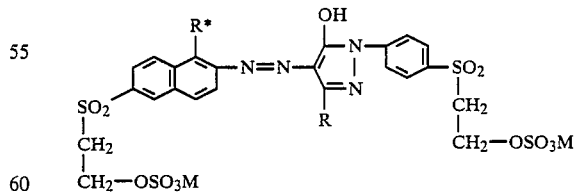

in which R* is hydrogen or sulfo, R is carboxy or carbalkoxy having 2 to 5 carbon atoms and M stands for hydrogen or an alkali metal.

12. The compound as claimed in claim 11, wherein R is carbethoxy and R* is sulfo.

13. The compound as claimed in claim 11, wherein R is carboxy and R* is hydrogen.

* * * * *